United States Patent [19]

Iwata et al.

[11] Patent Number: 4,700,563

[45] Date of Patent: Oct. 20, 1987

[54] ABNORMALITY DETERMINATION SYSTEM FOR REVOLUTION SPEED SENSOR

[75] Inventors: Yasunari Iwata; Hirokazu Usui, both of Toyota, Japan

[73] Assignee: Toyota Jidosha Kabushiki Kaisha, Toyota, Japan

[21] Appl. No.: 878,663

[22] Filed: Jun. 26, 1986

[30] Foreign Application Priority Data

Jun. 28, 1985 [JP] Japan .................... 60-143563

[51] Int. Cl.$^4$ .......................................... G01M 19/00
[52] U.S. Cl. .................................................. 73/118.1
[58] Field of Search .............. 73/118.1, 117.3, 117.2, 73/116; 324/160, 161; 364/424.1, 551, 550; 340/52 R; 123/352; 74/861

[56] References Cited

U.S. PATENT DOCUMENTS

| | | | |
|---|---|---|---|
| 4,412,290 | 10/1983 | Pannier | 364/424.1 |
| 4,468,958 | 9/1984 | Takeshita | 73/118.1 |
| 4,495,913 | 1/1985 | Gray | 123/352 |

FOREIGN PATENT DOCUMENTS 0010625  1/1983  Japan ...................... 73/118.1

Primary Examiner—Stewart J. Levy
Assistant Examiner—Robert R. Raevis
Attorney, Agent, or Firm—Oblon, Fisher, Spivak, McClelland, & Maier

[57] ABSTRACT

An improved abnormality determination system for revolution speed sensors is provided to accurately determine if either of two revolution speed sensors built in shafts of an automatic transmission is abnormal and to prevent itself from misjudging the abnormality of the speed sensor during shifting of the automatic transmission. Thus, the abnormality determination system for revolution speed sensors especially includes shifting detection means (M5) for detecting that an automatic transmission (M1) is shifting and for outputting a shifting indication signal which denotes that a shift of the automatic transmission is being executed, and abnormality determination halt means (M6) for halting the abnormality determination executed by abnormality determination means (M4) when the shifting indication signal is received in cruising condition.

7 Claims, 9 Drawing Figures

ABNORMALITY DETERMINATION SYSTEM FOR REVOLUTION SPEED SENSOR

BACKGROUND OF THE INVENTION

This invention relates to an abnormality determination system for revolution speed sensors, which determines if either of two speed sensors, one built in an input shaft and the other in an output shaft of an automatic transmission, is abnormal.

Shift control of an electronically-controlled automatic transmission is performed based on a vehicle speed, a throttle valve opening and other driving conditions. A vehicle speed is especially important as the basis of shift control. Thus, if an incorrect speed signal is outputted, there is a possibility that the automatic shift control cannot be accurately performed. For that reason, an abnormality determination system for revolution speed sensors has been proposed, which determines if either of the speed sensors, one built in an input shaft and the other in an output shaft of an automatic transmission, is abnormal by comparing outputs from both of the speed sensors, and which prevents the automatic transmission from using outputs from the abnormal speed sensor for shift control.

The abnormality determination processing described above is executed by comparing the number of output pulses from a first speed sensor built in an output shaft of a transmission with that from a second speed sensor built in an input shaft of the transmission. For example, while a predetermined number of pulses are outputted from the second speed sensor, if no pulse is outputted from the first speed sensor, the first speed sensor is determined to be abnormal. On the other hand, while a predetermined number of pulses are outputted from the first speed sensor, if no pulse is outputted from the second speed sensor, the second speed sensor is determined to be abnormal.

SUMMARY OF THE INVENTION

In an automatic transmission employing the above mentioned abnormality determination system, the input and the output shafts are not inter-connected during shifting. Thus, the relationship of the revolution speeds between the input shaft and the output shaft becomes indefinite during shifting of the automatic transmission. Accordingly, there is a problem that the abnormality determination system described above may determine that a speed sensor is abnormal even when the sensor is normal, if the abnormality determination processing is executed during shifting.

It is the object of this invention to provide an improved abnormality determination system for revolution speed sensors, which prevents misjudging the abnormality of a speed sensor during shifting of an automatic transmission.

Figure 1:
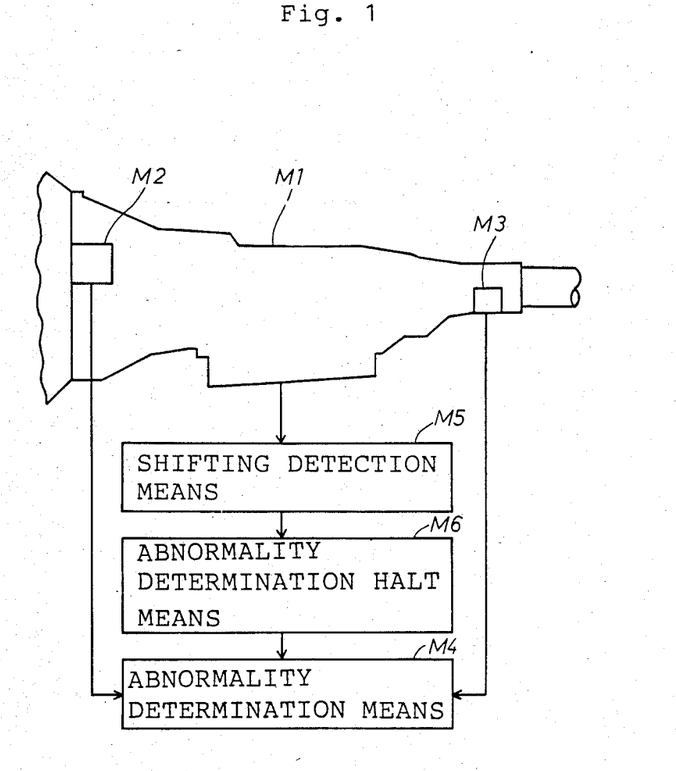
FIG. 1 is a basic block diagram illustrating an automatic transmission employing an abnormality determination system for revolution speed sensors according to the principles of this invention.

In order to achieve this and other objects, an abnormality determination system for revolution speed sensors according to this invention includes a second speed sensor M2 for detecting a revolution speed of one shaft of an automatic transmission M1 and for outputting a speed signal corresponding to the revolution speed, a first speed sensor M3 for detecting a revolution speed of another shaft of the automatic transmission M1 and for outputting a speed signal corresponding to the revolution speed, abnormality determination means M4 for determining if either of the speed sensors is abnormal by comparing a speed signal from the second speed sensor M2 with a speed signal from the first speed sensor M3 and for outputting an abnormality determination signal if it is determined that one of the speed sensors is abnormal, shifting detection means M5 for detecting that the automatic transmission M1 is shifting and for outputting a shifting indication signal which denotes that a shift of the automatic transmission is being executed, and abnormality determination halt means M6 for halting the abnormality determination executed by the abnormality determination means M4 when the shifting indication signal is received.

Each of the first speed sensor M3 and the second speed sensor M2 described above detects a revolution speed of each shaft by using, e.g., a reed switch and a magnet which rotate with the shaft.

For example, if an automatic transmission includes a torque converter and a shift unit including planetary gear units, the second speed sensor M2 is installed between the torque converter and the shift unit, and the first speed sensor M3 is installed in an output shaft of the shift unit.

There is another example. If an automatic transmission includes a primary shift unit including a torque converter and a shift unit and a secondary shift unit, the second speed sensor M2 is installed either between the torque converter and the shift unit or between the primary shift unit and the secondary shift unit. The first speed sensor M3 is installed in an output shaft of the secondary shift unit.

The abnormality determination means M4 determines if either of the second speed sensor M2 and the first speed sensor M3 is abnormal. For example, while a predetermined number of pulses are outputted from the first speed sensor M3, if no pulse is outputted from the second speed sensor M2, the second speed sensor M2 is determined to be abnormal. On the other hand, while a predetermined number of pulses are outputted from the second speed sensor M2, if no pulse is outputted from the first speed sensor M3, the first speed sensor M3 is determined to be abnormal.

The shifting detection means M5 detects if the automatic transmission M1, which is between the second speed sensor M2 and the first speed sensor M3, is shifting. For example, the shifting detection means M5 may detect a shifting of the automatic transmission M1 by a drive signal which is outputted from a shift control unit of the transmission M1 to solenoid valves thereof. The shifting detection means M5 may detect a shifting by a state of a flag variable for indicating a shifting, which is included in a control program of the automatic transmission M1.

The abnormality determination halt means M6 halts the abnormality determination processing executed by the abnormality determination means M4, or prevents results of the abnormality determination processing from being outputted, for an interval for which the automatic transmission M1 is determined to be shifting based on the result detected by the shifting detection means M5. The above-mentioned interval may be a time period for which the shifting indication signal is actually outputted or may be a predetermined interval which is counted by a timer from the beginning of shifting.

For example, the abnormality determination halt means M6 halts the operation of the abnormality determination means M4 which determines that the second speed sensor M2 is abnormal if no pulse is outputted from the second speed sensor M2, while a predetermined number of pulses are outputted from the first speed sensor M3, and which determines that the first speed sensor M3 is abnormal if no pulse is outputted from the first speed sensor M3, while a predetermined number of pulses are outputted from the second speed sensor M2. The abnormality determination halt means M6 may change the above-mentioned predetermined number to an extremely big number so as to prevent results of the abnormality determination processing from being outputted.

By employing the above-mentioned construction of this invention, the abnormality determination belt means M6 halts the operation of the abnormality determination means M4, which determines if either of the second speed sensor M2 and the first speed sensor M3 of the automatic transmission M1 is abnormal, while the shifting detection means M5 detects that shifting of the automatic transmission M1 is executed. Accordingly, the abnormality determination processing is not executed during shifting.

BRIEF DESCRIPTION OF DRAWINGS

The invention may be best understood by reference to the following detailed description and preferred embodiments and the accompanying drawings, wherein like numerals denote like elements and in which.

DETAILED DESCRIPTION OF PREFERRED EMBODIMENTS

A first embodiment of this invention will be now described with reference to diagrams and flow charts of FIG. 2 through FIG. 6.

Figure 2:
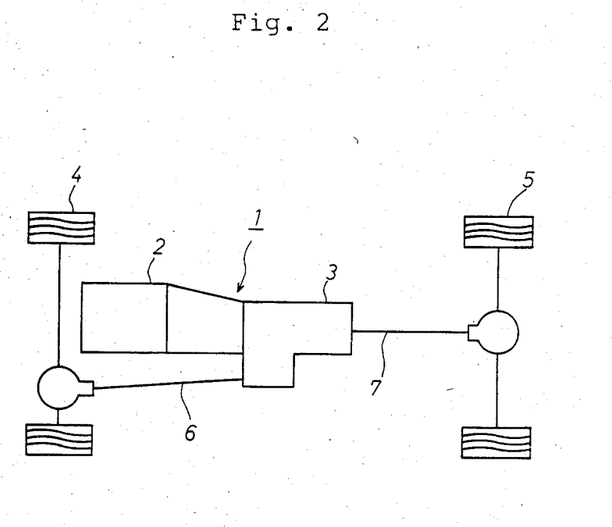
FIG. 2 illustrates a general construction of a first embodiment according to the principles of this invention.

FIG. 2 illustrates a general construction of a so-called part time four wheel drive automobile with an automatic transmission of the first embodiment. Numeral 1 denotes an automatic transmission. Numerals 2 and 3 respectively denote a primary shift unit and a secondary shift unit which are explained in detail afterwards with reference to FIG. 3. Numerals 4 and 5 denote front wheels and rear wheels, respectively. Numeral 6 denotes a propeller shaft which transmits the driving power to the front wheels. Numeral 7 denotes another propeller shaft which transmits the driving power to the rear wheels.

Figure 3:
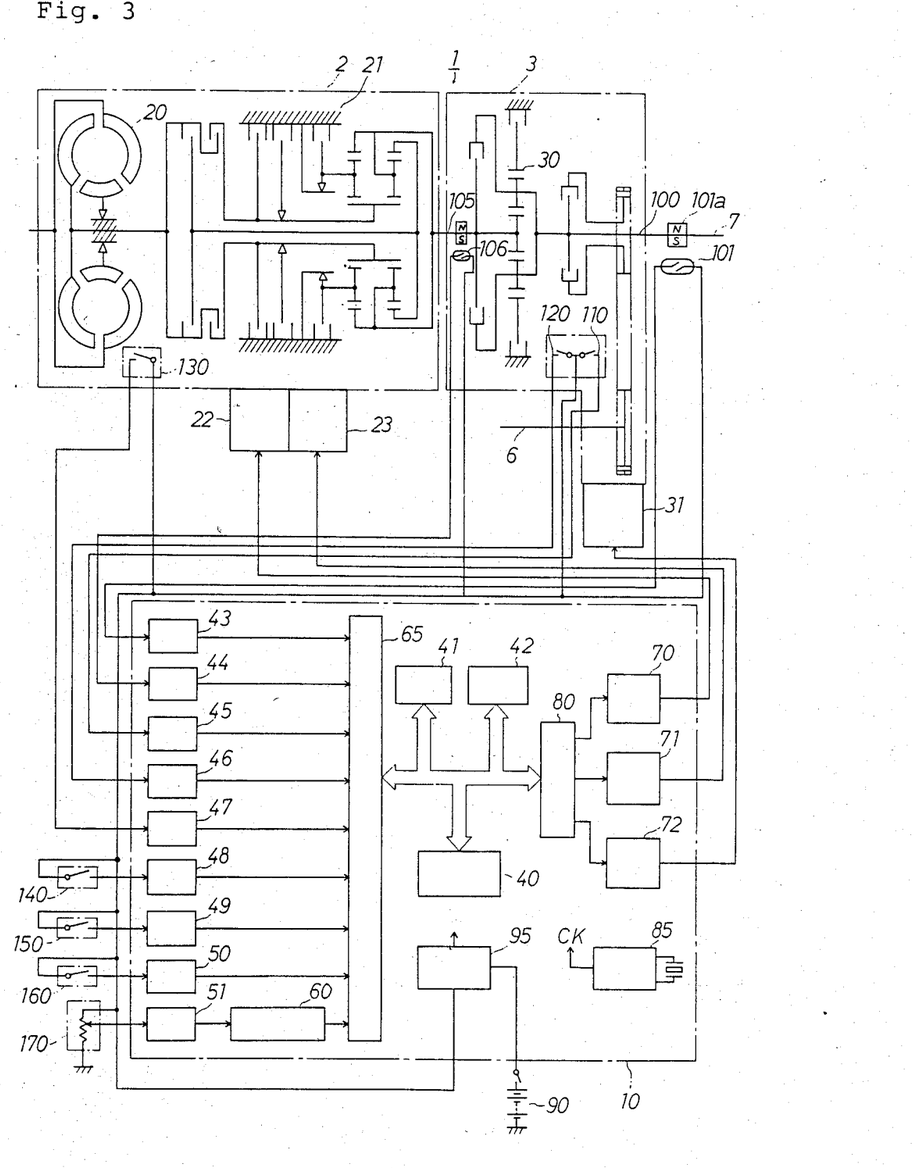
FIG. 3 illustrates a mechanical and electrical construction of the automatic transmission of the first embodiment of FIG. 2.

FIG. 3 illustrates a mechanical and electrical construction of the primary shift unit 2, the secondary shift unit 3 and an Electronic Control Unit (ECU) 10 of the automatic transmission 1 illustrated in FIG. 2.

The primary shift unit 2 includes a torque converter 20 and a shift unit 21. The shift unit 21 has solenoid valves 22 and 23 for controlling the shift unit 21 electrically.

The secondary shift unit 3 includes a shift unit 30 for switching between four states: a high-speed rear wheel drive (hereinafter referred to as H2), a high-speed four wheel drive (hereinafter referred to as H4), a low-speed rear wheel drive (hereinafter referred to as L2) and a low- speed four wheel drive (hereinafter referred to as L4). The shift unit 30 can be manually switched between H2, H4, L2 and L4. It is also possible to be switched between a high-speed drive and a low-speed drive by a solenoid valve 31.

The ECU 10 includes a Central Processing Unit (CPU) 40, a Read Only Memory (ROM) 41 for storing programs and data and a Random Access Memory (RAM) 42 for storing computed results temporarily. Furthermore, the ECU 10 includes an input port 65, an output port 80, a clock 85 and a power unit 95. The input port 65 receives outputs from buffers 43 thru 50 and an A/D converter 60. The buffers 43 thru 50 receive and output digital signals. The A/D converter 60 converts analog signals outputted from a buffer 51 into digital signals. The output port 80 outputs a control signal to solenoid valve controllers 70 thru 72 which supply power for operating the solenoid valves 22, 23 and 31 of the primary shift unit 2 and the secondary shift unit 3. The clock 85 outputs a standard clock pulse to each unit. The power unit 95 receives a power from a battery 90 and supplies constant-voltage power to each unit and sensor.

The buffer 43 receives outputs from a first speed sensor 101. Every time an output shaft 100 of the secondary shift unit 3 makes one complete revolution, a built-in magnet 101a mounted on the output shaft 100 activates a reed switch, which is built in the first speed sensor 101. In this manner, the first speed sensor 101 detects a revolution speed of the output shaft 100. The buffer 44 receives outputs from a second speed sensor 106 which detects a rotation speed of an input shaft 105 of the secondary shift unit 3 in the same manner described above. The buffer 45 receives outputs from a speed state sensor 110 which detects if the secondary shift unit is in a high-speed state or in a low-speed state. The buffer 46 receives outputs from a 4-2 drive state sensor 120 which detects if the secondary shift unit is a rear wheel drive state or a four wheel drive state. The buffer 47 receives outputs from a neutral state sensor 130 which detects if the primary shift unit 2 is in a neutral state. The buffer 48 receives outputs from an overdrive switch 140. The buffer 49 receives outputs from a brake switch 150. The buffer 50 receives outputs from a pattern select switch 160 for setting a shift pattern which a driver desires. The buffer 51 receives outputs from a throttle opening sensor 170.

The operation of the automatic transmission employing the construction of the above-mentioned first embodiment will be explained with reference to flow charts of FIGS. 4A thru 6.

Figure 4A:
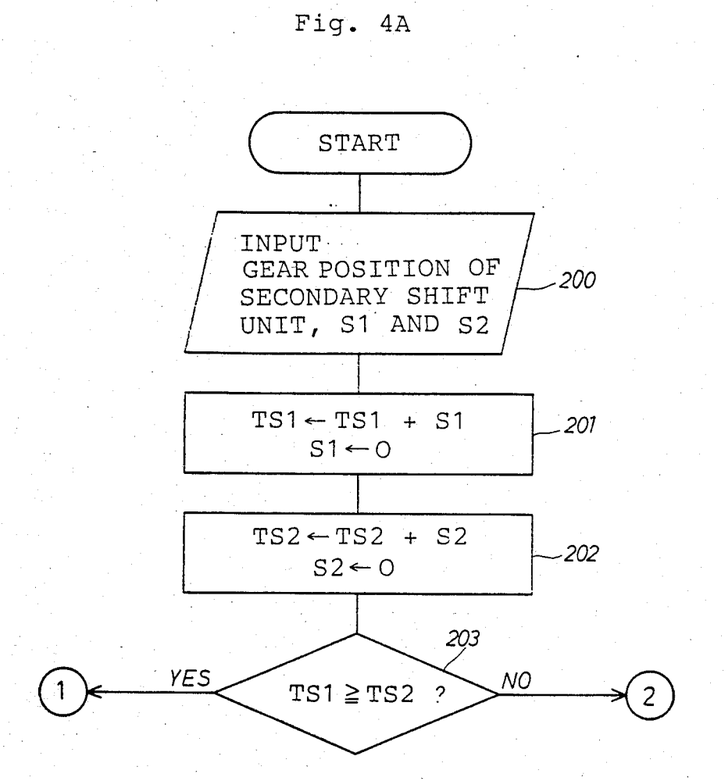
FIGS. 4A and 4B are flow charts showing the operation of the automatic transmission of the first embodiment of FIG. 2.

At step 200, a variable showing a gear position of the secondary shift unit 3, a variable S1 showing an output pulse from the first speed sensor 101 and a variable S2 showing an output pulse from the second speed sensor 106 are inputted. At step 201, an accumulation variable TS1 is computed by accumulating output pulses S1 (TS1→TS1+S1). At step 202, an accumulation variable TS2 is computed by accumulating output pulses S2 (TS2→TS2+S2).

At a decision point 203, TS1 is compared with TS2. If TS1 is greater than or equal to TS2, the program proceeds to step 204 of FIG. 4B where the second speed sensor abnormality determination is executed, which is described in detail afterwards with reference to FIG. 5. Since a revolution speed of the output shaft 100 is normally less than a rotation speed of the input shaft 105 in the secondary shift unit 3, if TS1 is determined to be greater than or equal to TS2, the second speed sensor 106 may be abnormal. If TS1 is less than TS2, the program proceeds to step 205 of FIG. 4B where a gear position of the secondary shift unit is determined. If the gear is in a H-gear position (high-speed state), the program proceeds to step 206 where a value 4 is substituted for a reference variable X. The value 4 is based upon the instantaneous detection error of the speed sensors, so that false abnormality determinations will not be made due to a detection error. If the gear is in a L-gear position (low-speed state), the program proceeds to step 207 where a value 10 is substituted for the reference variable X. If the gear is being shifted, the program proceeds to step 208 where a value 255 is substituted for the reference variable X. Namely, a value corresponding to the gear position of the secondary shift unit 3 is substituted for the reference variable X at step 206, 207 or 208. From each of the program steps 206, 207 and 208, the program proceeds to a decision point 209 where the accumulation variable TS2 is compared with the reference variable X. If TS2 is greater than or equal to X, the program proceeds to step 210 where the first speed sensor abnormality determination is executed, which is described in detail afterwards with reference to FIG. 6. If TS2 is less than X, the program exits from this routine.

Figure 4B:
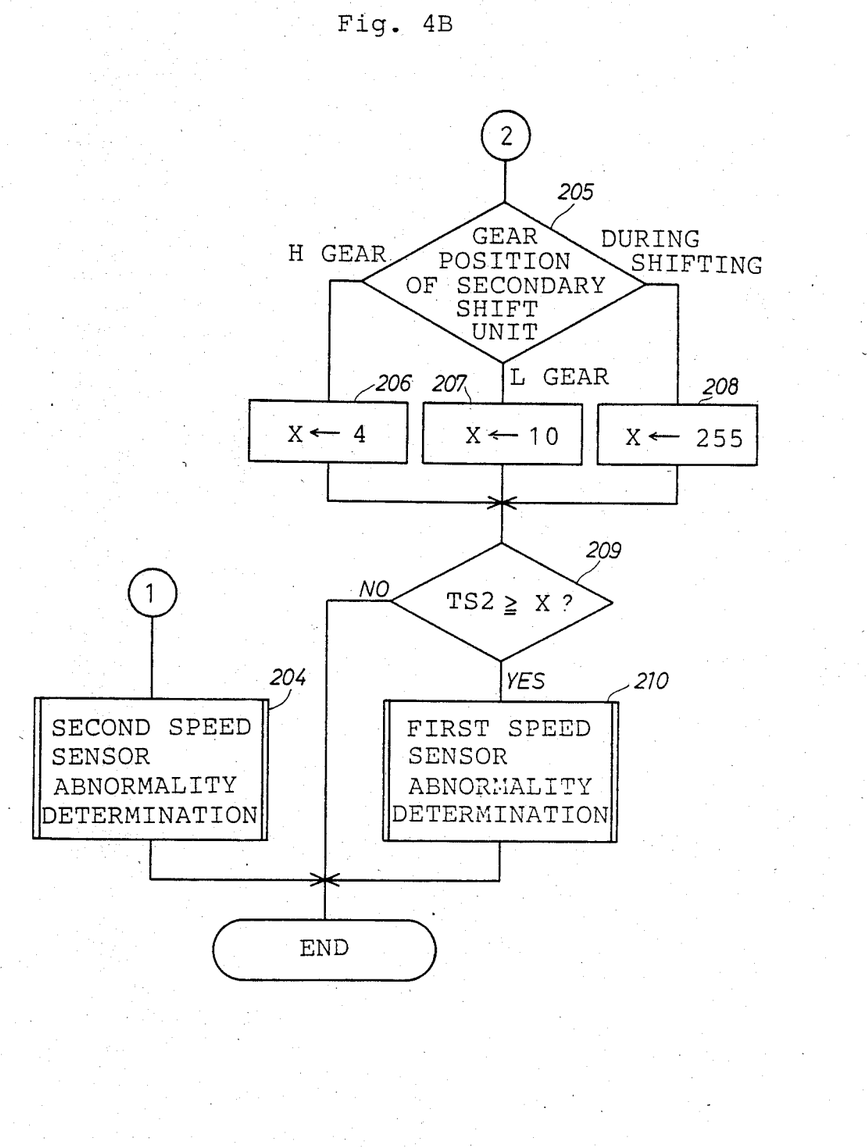

In summary, at steps 203 through 210, if the accumulation variable TS1 is greater than or equal to the accumulation variable TS2, the second speed sensor abnormality determination is executed. If TS1 is less than TS2, and TS2 is greater than or equal to the reference variable X, the first speed sensor abnormality determination is executed. In the reference variable X, each value is substituted corresponding to each gear position of the secondary shift unit 3. When the gear is in the H-gear position, the value 4 is substituted for X. When the gear is in the L-gear position, the value 10 is substituted for X considering the gear ratio. That is, due to the low gearing, a detection error must be multiplied by the gear ratio of the secondary shift unit (here assumed to be 2.2; 2.5×4=10) in order to assure that a false abnormality determination will not be made. Thus, the first speed sensor abnormality determination is appropriately executed corresponding to the gear position. On the other hand, while the gear is being shifted, the value 255, which TS2 can not reach when shafts are interconnected, is substituted for X. Thus, the first speed sensor abnormality determination is not executed during shifting.

Figure 5:
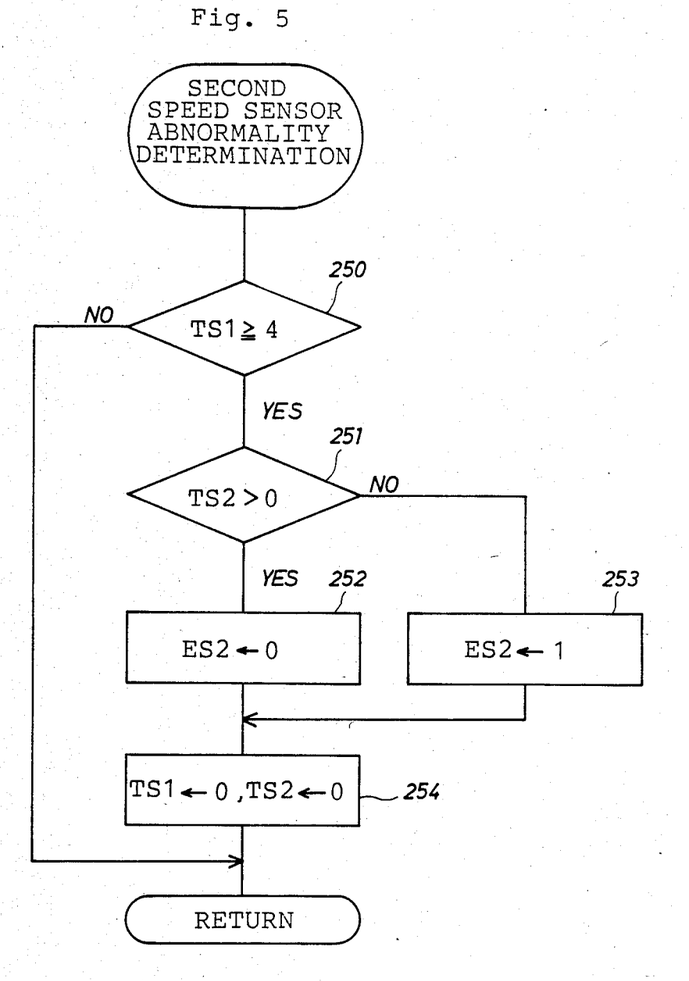
FIG. 5 is a flow chart illustrative of the second speed sensor abnormality determination routine in the flow chart of FIG. 4B.

FIG. 5 illustrates the operation of the second speed sensor abnormality determination in detail, which is executed at step 204 of FIG. 4B. At a decision point 250, the accumulation variable TS1 is compared with the value 4. If TS1 is greater than or equal to 4, the program proceeds to step 251 and if not, the program exits from this routine.

At a decision point 251, it is determined if the accumulation variable TS2, computed by accumulating output pulses from the second speed sensor 106, is greater than zero. If TS2 is greater than zero, the program proceeds to step 252, and if not, i.e. if TS2 is equal to zero, the program proceeds to step 253. At step 252, a second speed sensor abnormality flag ES2 is reset to zero. The second speed sensor abnormality flag ES2 is used for determining if speed signals from the second speed sensor 106 can be used for shift control in another control routine of the automatic transmission 1, which is not described in this embodiment. At step 253, the second speed sensor abnormality flag ES2 is set to 1 for indicating that speed signals from the second speed sensor 106 are abnormal. From each of the program steps 252 and 253, the program cycle proceeds to step 254 at which the variables TS1 and TS2 are reset to zero and the program exits from this routine.

Figure 6:
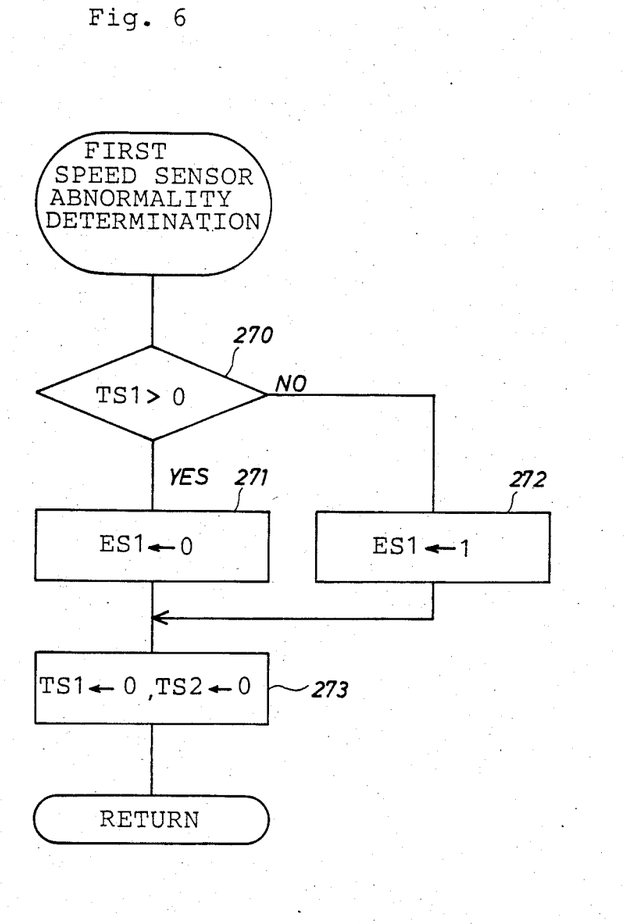
FIG. 6 is a flow chart illustrative of the first speed sensor abnormality determination routine in the flow chart of FIG. 4B.

FIG. 6 illustrates the operation of the first speed sensor abnormality determination in detail, which is executed at step 210 of FIG. 4B. At a decision point 270, it is determined if the accumulation variable TS1, computed by accumulating output pulses from the first speed sensor 101, is greater than zero. If TS1 is greater than zero, the program proceeds to step 271 and if not, i.e. TS1 is equal to zero, the program proceeds to step 272. At step 271, a first speed sensor abnormality flag ES1 is reset to zero. At step 272, the first speed sensor abnormality flag ES1 is set to 1 for indicating that speed signals from the first speed sensor 101 are abnormal. From each of the program steps 271 and 272, the program cycle proceeds to step 273 at which the variables TS1 and TS2 are reset to zero and the program exits from this routine.

As explained above, while it is determined if either of the first speed sensor 101 and the second speed sensor 106 is abnormal by comparing output signals from both of the sensors, the reference variable X, which is compared with TS2 for determining if the first speed sensor is normal, can be changed from the value corresponding to the H-gear or L-gear position (e.g., 4 or 10 in this embodiment) to the value for indicating that a shift is being executed (e.g., 255 in this embodiment). Even if the secondary shift unit 3 is shifted while no pulse or very few pulses are outputted from the first speed sensor 101 because of a very low vehicle speed, the shifting can be accomplished before the variable TS2, computed by accumulating output pulses from the second speed sensor 106, reaches 255. Thus, the system of this embodiment prevents the first speed sensor 101 from being mistakenly determined to be abnormal.

The reference value 4, in H-gear position of FIG. 4B and in the second speed sensor abnormality determination routine of FIG. 5, is determined, again considering an instantaneous detection error of each speed sensor. The reference value 10 in L-gear position of FIG. 4B is again determined considering the gear ratio of the secondary shift unit 3 in L-gear position and the detection error.

A second embodiment of this invention will be described. The construction of the second embodiment is the same as that of the first embodiment, thus, the explanation thereof is omitted.

Figure 7A:
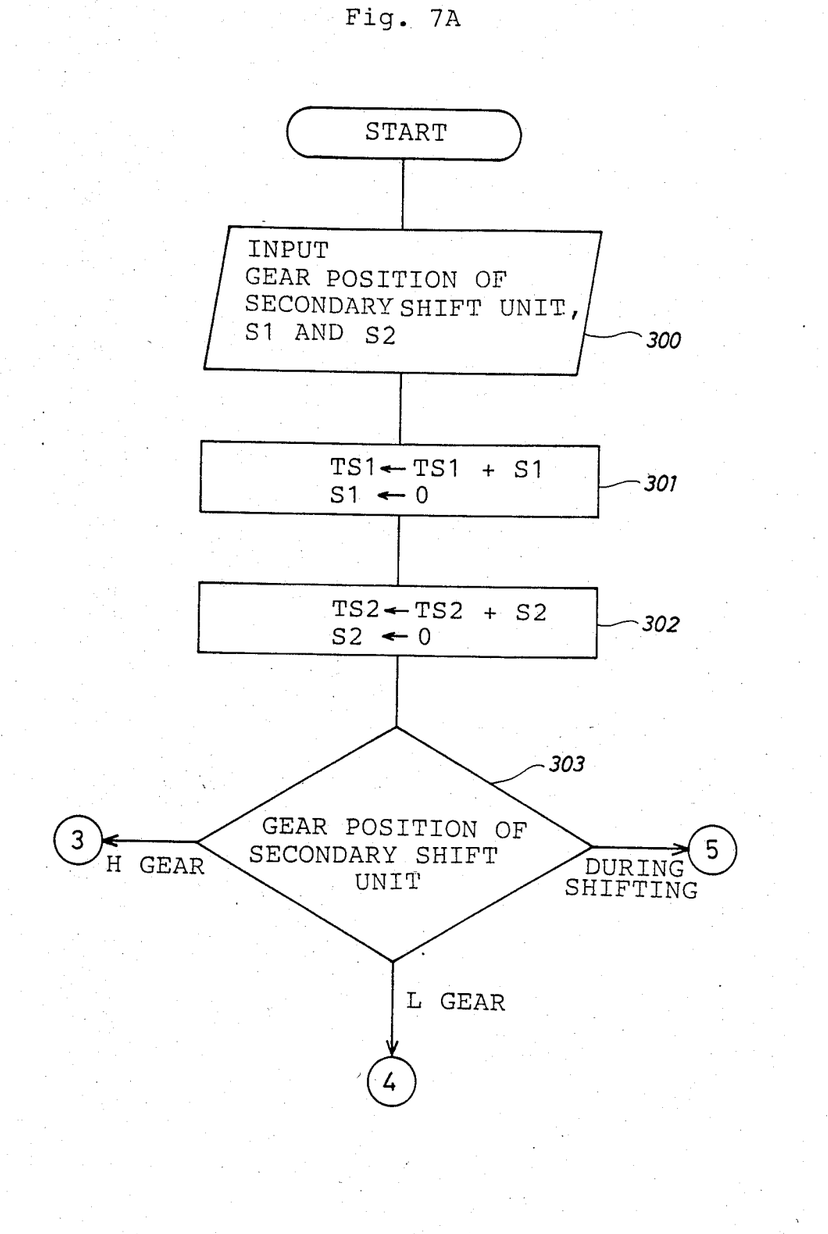
FIGS. 7A and 7B are flow charts showing the operation of an automatic transmission of a second embodiment employing the principles of this invention.
Figure 7B:
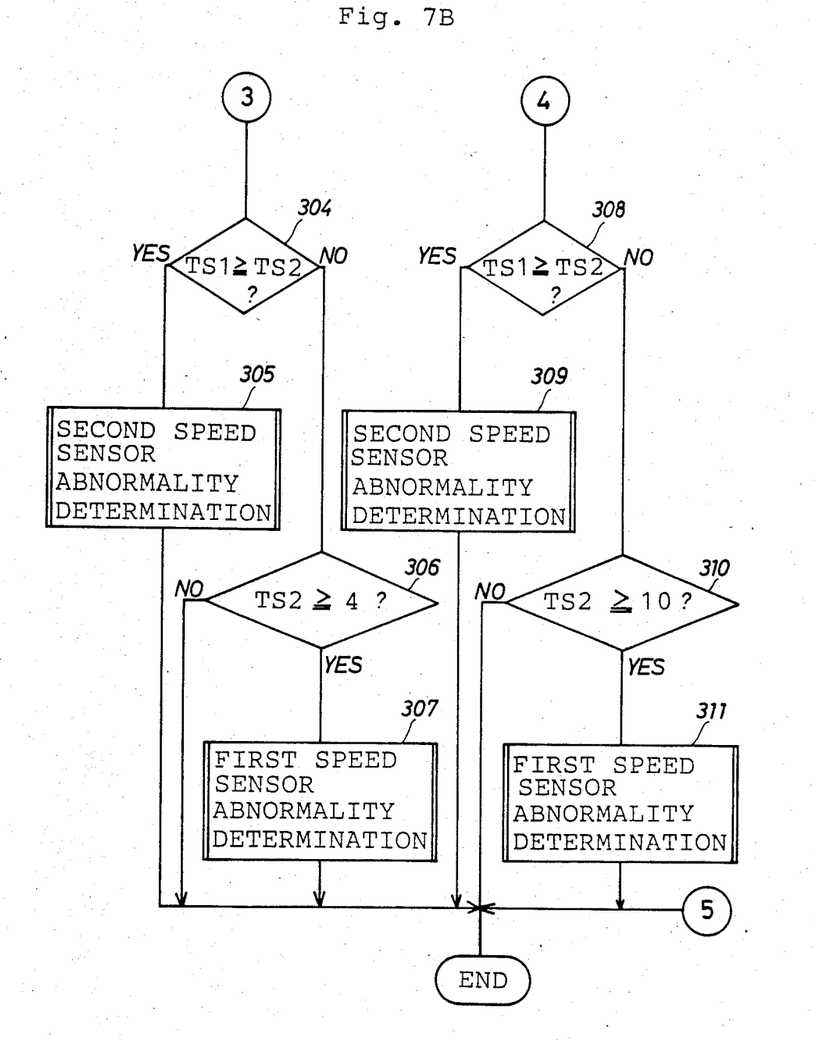

The operation of the second embodiment is illustrated in flow charts of FIGS. 7A and 7B. In the same manner as the first embodiment, at step 300 of FIG. 7A, variables showing a gear position of the secondary shift unit 3 and output pulses S1 and S2 from the first and the second speed sensors are inputted. At steps 301 and 302, accumulation variables TS1 and TS2 are computed. At step 303, the gear position of the secondary shift unit 3 is detected. If the gear is in H-gear position, the program proceeds to a decision point 304 of FIG. 7B at which TS1 is compared with TS2. If TS1 is greater than or equal to TS2, the program cycle proceeds to step 305 where the second speed sensor abnormality determination is executed. If TS1 is less than TS2, the program cycle proceeds to steps 306 and 307 where the first speed sensor abnormality determination is executed. If the gear is in L-gear position, the first and the second speed sensor abnormality determination are executed at steps 308 through 311. Although the order of determination of the gear position of the secondary shift unit 3 and comparison between TS1 and TS2 is reversed between the first and the second embodiments, the operation is the same. If the gear is being shifted, the program exits from this routine. Thus, the abnormality determination of speed sensors is not executed during shifting of the secondary shift unit 3.

The foregoing description of preferred embodiments for the purpose of illustrating the invention is not to be considered as limiting or restricting the invention, since many modifications may be made by one skilled in the art without departing from the scope of the invention. For example, in the first and the second embodiments described above, the abnormality determination system of this invention is used for speed sensors installed in an input shaft and an output shaft of the secondary shift unit 3. It is also possible, however, that the abnormality determination system is used for speed sensors installed in an input shaft and an output shaft of the primary shift unit 2 or for those installed at both ends of the automatic transmission 1.

What is claimed is:

1. An abnormality determination system for revolution speed sensors comprising:
   a first speed sensor for detecting a revolution speed of one shaft of an automatic transmission and for outputting a first speed signal corresponding to the speed;
   a second speed sensor for detecting a revolution speed of another shaft of said automatic transmission and for outputting a second speed signal corresponding to the speed;
   abnormality determination means for determining if either of said speed sensors is abnormal by comparing the first speed signal from said first speed sensor with the second speed signal from said second speed sensor, and for outputting an abnormality determination signal if it is determined that one of said speed sensors is abnormal;
   shifting detection means for detecting that said automatic transmission is shifting and for outputting a shifting indication signal which denotes that a shift of the automatic transmission is being executed; and
   abnormality determination halt means for halting the abnormality determination executed by said abnormality determination means when the shifting indication signal is received.

2. The abnormality determination system for revolution speed sensors according to claim 1, wherein:
   the abnormality determination means includes means for receiving output pulses from both the first speed sensor and the second speed sensor, and has means for generating the abnormality determination signal if no pulse is outputted from one speed sensor while a predetermined number of pulses are outputted from the other speed sensor.

3. The abnormality determination system for revolution speed sensors according to claim 1, wherein:
   the automatic transmission includes an Electronic Control Unit (ECU), and
   the shifting detection means includes means for detecting that a shift of the automatic transmission is being executed, via a shift command signal generated by the ECU.

4. The abnormality determination system for revolution speed sensors according to claim 1, wherein:
   the abnormality determination halt means comrpises means for halting the abnormality determination, which is executed by the abnormality determination means, only while the abnormality determination halt means receives the shifting indication signal.

5. The abnormality determination system for revolution speed sensors according to claim 1, wherein:
   the abnormality determination halt means comprises means for halting the abnormality determination, which is executed by the abnormality determination means, from the time at which the abnormality determination halt means receives the shifting indication signal and for an interval predetermined by considering a time period required for completing shifting.

6. The abnormality determination system for revolution speed sensors according to claim 1, wherein:
   the automatic transmission includes a primary shift unit and a secondary shift unit;
   the secondary shift unit has an output shaft corresponding to said one shaft of the automatic transmission and an input shaft corresponding to said another shaft of the automatic transmission; and
   the first speed sensor comprises means for detecting a revolution speed of the output shaft of the secondary shift unit and the second speed sensor comprises means for detecting a revolution speed of the input shaft of the secondary shift unit.

7. The abnormality determination system for revolution speed sensors according to claim 1, wherein
   the abnormality determination means changes a condition for comparing speed signals from both of the first and the second speed sensors, in response to current gear ratio of the automatic transmission.

* * * * *

Notice of Adverse Decisions in Interference

In Interference No. 102,336, involving Patent No. 4,700,563, Y. Iwata and H. Usui, ABNORMALITY DETERMINATION SYSTEM FOR REVOLUTION SPEED SENSOR, final judgment adverse to the patentees was rendered Feb. 21, 1991, as to claims 1, 3 and 7.

*(Official Gazette September 3, 1991.)*